(12) United States Patent
Jin et al.

(10) Patent No.: US 7,904,441 B2
(45) Date of Patent: Mar. 8, 2011

(54) APPARATUS AND METHOD FOR RECOVERING FINAL DISPLAY

(75) Inventors: Hee-Gyu Jin, Suwon-si (KR); Kyoung-Gu Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 11/936,331

(22) Filed: Nov. 7, 2007

(65) Prior Publication Data

US 2008/0294623 A1    Nov. 27, 2008

(30) Foreign Application Priority Data

May 22, 2007    (KR) ...................... 10-2007-0049702

(51) Int. Cl.
    *G06F 17/00*    (2006.01)
(52) U.S. Cl. ..................... 707/706; 707/708; 707/710; 707/721; 707/727
(58) Field of Classification Search .................. 707/706, 707/708, 710, 721, 727
    See application file for complete search history.

(56) References Cited

U.S. PATENT DOCUMENTS

| 5,809,331 | A | 9/1998 | Staats et al. |
| 6,606,618 | B2 | 8/2003 | Delo |
| 2008/0077558 | A1* | 3/2008 | Lawrence et al. ............... 707/3 |

FOREIGN PATENT DOCUMENTS

| JP | 07-234772 A | 9/1995 |
| KR | 10-1997-0049604 A | 7/1997 |
| KR | 10-2004-0060620 A | 7/2004 |
| KR | 10-2007-0003468 A | 1/2007 |

* cited by examiner

*Primary Examiner*—Sana Al-Hashemi
(74) *Attorney, Agent, or Firm*—Sughrue Mion, PLLC

(57) ABSTRACT

An apparatus and method of recovering a final display are provided. The apparatus includes a query-string-creating module creating query strings in response to a cursor-request message, a query-string-controlling module creating a first cursor as a result of processing the query strings, and returning the created first cursor to the query-string-creating module, and a cursor-recovery module storing information about the first cursor and recovering information about a second cursor in response to the cursor-request message.

10 Claims, 5 Drawing Sheets

APPARATUS AND METHOD FOR RECOVERING FINAL DISPLAY

CROSS-REFERENCE TO RELATED APPLICATION

This application claims priority from Korean Patent Application No. 10-2007-0049702 filed on May 22, 2007 in the Korean Intellectual Property Office, the disclosure of which is incorporated herein by reference in its entirety.

BACKGROUND OF THE INVENTION

1. Field of the Invention

Apparatus and methods consistent with the present invention relate to an apparatus and method of recovering a final display, and more particularly, to an apparatus and method of recovering a final display such that second cursor information is constructed by extracting n pieces of iterator information contained in first cursor information in response to a cursor information storage message of a cursor-request message, storing the second cursor information while a portable digital device having an embedded DBMS is in a normal operation, and mapping the n pieces of iterator information contained in the second cursor information to third cursor information by referring to query strings contained in the second cursor information in response to a cursor-information-recovery-request message.

2. Description of the Related Art

With the trends of fabrication of large-capacity storage devices and the proliferation of digital devices using the same, amounts of content stored in and managed by digital devices are rapidly increasing.

In recent years, not only folder-search-based user interfaces (UIs) but also content-search-based UIs have been widely adopted, allowing users of digital devices to effectively utilize a large amount of contents.

To implement a content-search-based UI, a digital device needs to be capable of managing and retrieving metadata for content stored in the digital device. Accordingly, more recently, there has been a growing trend toward portable digital devices employing a DBMS (Database Management System) having data management and storage capabilities.

The DBMS is a program that allows a plurality of users to record data in a database or to access the database to retrieve information stored in the database by providing environments in which convenient data storage and efficient data management can be achieved. In addition, the DBMS integrates remote data by application program, so that each application program can share the integrated data, enabling systematic utilization of information.

The DBMS performs defining of a collected data structure, gathering data according to data structure, data retrieval and renewal using database languages, simultaneous execution control of data processing by multiple users, returning to the original state in the event of an abnormality occurring while renewing data, management of information security, and so on. A typical DBMS is a Relational Database Management System (RDBMS) that uses a Structured Query Language (SQL) interface.

In the case of a portable digital device having an embedded DMBS performing the above-described functions, users of the portable digital device have requested the capability of recovering a final display in the event of a power interruption.

In a general final-display-recovery process, as a portable digital device is supplied with power, a bootloader is executed to drive an operation system. Once the operation system is driven, data acquisition for outputting a display is performed, and then data is output through a display device. Here, the operations of power supply, driving the operation system, execution of the bootloader, and display outputting are performed irrespective of the amount of data (e.g., common content like music, moving images, or images) stored in the digital device. However, in the data acquisition operation, data required for screen display is acquired by allowing the embedded DBMS to execute queries. In the case where the queries for data acquisition are inappropriately processed, the amount of content (target queries) increases, so that a query processing time may linearly increase.

That is, in the case of data acquisition for final data recovery, a query-processing time depends upon the amount of content (target queries).

In a portable digital device having an embedded DBMS that operates normally, predetermined queries are generated for data acquisition so that query processing is performed by the DBMS. Query processing results are accessed by cursor objects. Thus, acquiring data from the normally-operating DBMS means acquiring cursor objects for display output responding to a user input.

That is, in a portable digital device in which power is frequently turned on/off, recovering a final display means recovering a search position of a database when the database search is terminated because a cursor start position when the portable digital device is restarted corresponds to the search position when the database search is terminated.

One approach for recovering a search position is to use a cursor such that the cursor position is stored by storing query strings. Then, the stored query strings are loaded when recovering the cursor position, thereby creating the cursor. Once the cursor is created, the cursor position is moved sequentially while determining whether the position of the cursor created by loading the query strings is identical with a position of the cursor currently in use, thereby recovering the search position.

Such a search-position-recovery scheme may, however, impose several problems. For example, performance degradation due to cursor position movement may be caused as the stored cursor position becomes distant from the current cursor position. Further, as the amount of content of the target queries increases, the recovery time may increase.

Another approach for recovering a search position is to store query results in a disk prior to power interruption of a portable digital device, and recycle the stored query results when restarting the portable digital device. In the related art, query strings are stored when storing a cursor, and a current cursor position is temporarily stored.

For storage of all search results, the cursor is moved to the first cursor position, and search results corresponding to query strings are stored while moving the cursor until the last search result is reached. Once the storage of all search results is completed, the cursor is moved to the current cursor position that is temporarily stored.

Thereafter, when restarting the portable digital device, the search position recovery is performed by loading pre-stored search results stored according to the cursor search results before the cursor is created, and searching for the cursor position based on the loaded search results.

However, this is disadvantageous in that considerable search result storage costs may be involved in a search position storage stage. In order to store all search results in the search position storage stage, data of fields selected while the current cursor is moved throughout all the search results from the first to the last search results should be stored in a separate space. That is, recovery performance is liable to degrade according to the number of times the cursor is moved, the size of data stored, the number of search results, the number of fields selected, and so on.

That is, according to the related art, cursor position storage for final-display recovery and a search position recovery scheme using a re-search method in a search position recovery stage may cause performance degradation due to an increase in the number of times the cursor is moved. Accordingly, as the stored cursor position becomes distant from the first search result, the recovery performance in the search position recovery stage may become very poor. In addition, it is highly probable that the search-position-recovery performance may degrade as the amount of content as target queries.

Still another approach for recovering a search position is to store search results, which, however, also entails several disadvantages. That is, degradation of recovery performance may be caused due to the size of stored data. In addition, an increased number of search results may increase the number of fields selected, which causes an increase in the amount of data stored, unavoidably degrading the performance in the search-position-recovery stage.

The related art search position recovery schemes renders severe degradation in the performance in a search position recovery stage (using a re-search method) or a search position storage stage (using stored search results). Accordingly, a methodology for recovering a search position without performance degradation is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides an apparatus and method of recovering a final display such that second cursor information is constructed by extracting n pieces of iterator information contained in first cursor information in response to a cursor information storage request message of a cursor-request message, storing the second cursor while a portable digital device having an embedded DBMS is in a normal operation, and mapping to a third cursor n pieces of iterator information contained in the second cursor information by referring to query strings contained in the second cursor information in response to a cursor-information-recovery-request message.

The above and other features of the present invention will be described in or be apparent from the following description of the exemplary embodiments.

According to an aspect of the present invention, there is provided an apparatus for recovering a final display, the apparatus including a query-string-creating module creating query strings in response to a cursor-request message, a query-string-controlling module creating a first cursor as a result of processing the query strings and returning the created first cursor to the query-string-creating module, and a cursor-recovery module storing information about the first cursor and recovering information about a second cursor in response to the cursor-request message.

According to another aspect of the present invention, there is provided a method of recovering a final display, the method including creating query strings in response to a cursor-request message, creating a first cursor as a result of processing the query strings and returning the created first cursor in the query-string-creating operation, and storing information about the first cursor and recovering information about a second cursor in response to the cursor-request message.

BRIEF DESCRIPTION OF THE DRAWINGS

The above and other features of the present invention will become apparent by describing in detail exemplary embodiments thereof with reference to the attached drawings in which.

DETAILED DESCRIPTION OF THE EXEMPLARY EMBODIMENTS INVENTION

Figure 1:
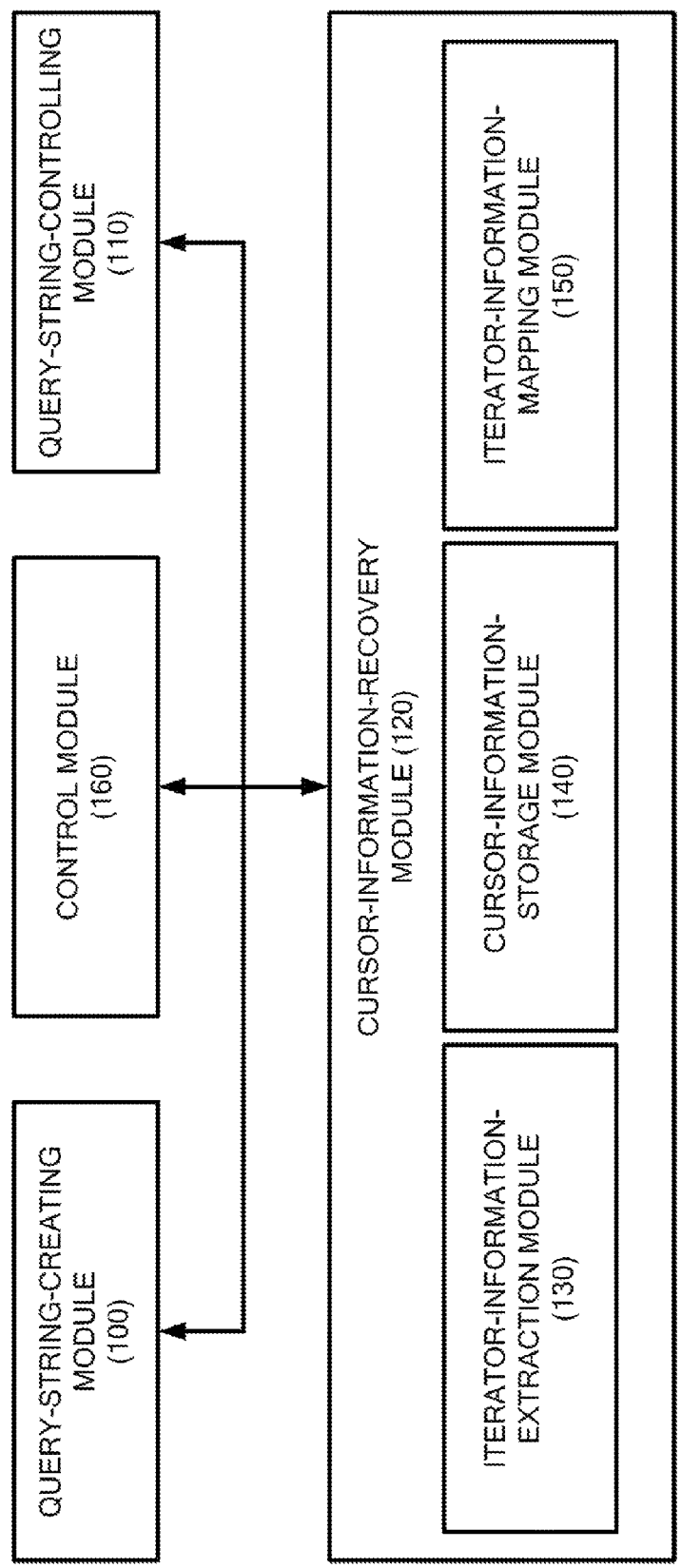
FIG. 1 is a schematic diagram of an apparatus for recovering a final display according to an exemplary embodiment of the present invention.

The above aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

FIG. 1 is a schematic diagram of an apparatus for recovering a final display according to an exemplary embodiment of the present invention.

The final-display-recovering apparatus according to an exemplary embodiment of the present invention performs cursor information storage in a digital device (not shown) having an embedded DBMS (Database Management System), and final-display recovery using the stored cursor information.

In the final-display-recovering apparatus according to an exemplary embodiment of the present invention, a cursor operation mode may either be a snapshot or a pipeline mode; the pipeline mode is preferred.

The final-display-recovering apparatus stores cursor information and recovers a final display based on the stored cursor information by including a query-string-creating module 100, a query-string-controlling module 110, a control module 160, and a cursor-information-recovery module 120.

However, the configuration of the final-display-recovering apparatus according to exemplary embodiments the present invention is not limited to the illustrated example and may comprise all components that can be derived or combined from the listed components.

First, the query-string-creating module 100 creates predetermined query strings in response to a cursor-request message of the control module 160. An exemplary query-stringcreating module is a common application program of a general digital device having an embedded DBMS.

The cursor-request message of the control module 160 is a message for requesting generation of a first cursor during normal operation of the digital device having an embedded DBMS which includes the final-display-recovering apparatus, and may include a first cursor-information-storage message and a second cursor-information-recovery message.

Once the predetermined query strings is created in response to the cursor-request message, the query strings are delivered to the query-string-creating module 100.

The query-string-controlling module 110 performs processing of queries corresponding to the query strings delivered from the query-string-controlling module 110. The query-string-controlling module 110 generates a first cursor as a result of query processing, and returns the first cursor to the query-string-creating module 100. The query-string-controlling module 110 may include a common DBMS, but is not limited thereto. The query-string-controlling module 110 may also include a main memory DBMS.

In the query processing in the query-string-controlling module 110, the results corresponding to the query strings delivered from the query-string-creating module 100 are obtained and then returned to the query-string-creating module 100.

The query-string-creating module 100 may obtain query results using the previously created first cursor by row. Here, a position of the first cursor is a row currently indicated by the cursor in a set of query results and the position of the first cursor may change through row-wise forward and rearward movements in order to obtain the query results by row.

The query-string-controlling module 110 performing query processing generally comprises a query string parsing operation of converting an SQL statement into a format in a parser tree (not shown) to interpret query strings input in SQL, a logical query planning establishing operation of converting the query strings in the parser-tree format into a relational algebra format, and a physical-query-planning operation of materializing a logical plan tree having a logical plan tree (not shown) into a physical plan tree.

In the physical-query-planning operation, each node of the logical plan tree is selected as a query operator, and then an object that is accessible to the topmost query operator, which is called a cursor object, is returned to the query-string-creating module 100.

The cursor object is a combination of various query operators selected by the physical-query planning and arranged in a tree shape.

Figure 2:
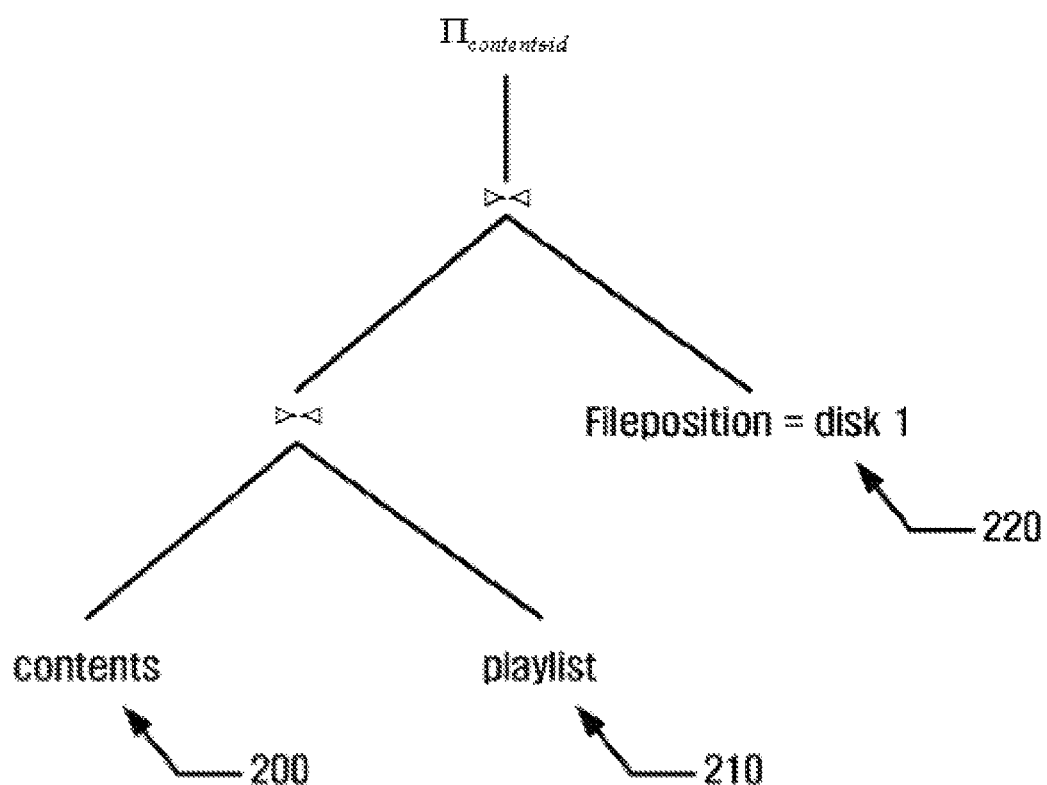
FIG. 2 is a diagram of a query-plan tree according to an exemplary embodiment of the present invention.

Referring to FIG. 2, showing a query plan tree according to an exemplary embodiment of the present invention, among query operators, a request-based operator is called a query iterator (referred to as an "iterator" hereinafter). In a pipeline mode of the cursor according to an exemplary embodiment of the present invention, all internal query operators are iterators.

The query processing result in the query-string-controlling module 110 is obtained by selecting a predetermined result satisfying query conditions according to the positional movement of iterators.

That is, the position information of the first cursor may be determined by positions of n iterators constructing the first cursor.

The query plan tree shown in FIG. 2 is generated when processing the query strings delivered from the query-string-creating module 100, for example, Select contents-id from Contents, Playlist, and Fileposition where contents=playlist and fileposition='disk1'.

As stated above, all internal query operators are iterators in the pipeline mode. Thus, in the query plan tree shown in FIG. 2, record of content 200, a playlist 210 and a fileposition 220 are all iterators. A first cursor position is represented by a predetermined record where a record where the record of the content 200 and the record of the Playlist 210 identical with each other is identical with a record where the fileposition 220='disk1'.

That is, the first cursor position is determined by the iterator representing the content 200, the iterator representing Playlist 210, and the iterator representing fileposition 220. Therefore, in the final-display-recovering apparatus according to an exemplary embodiment of the present invention, final-display recovery can be performed based on information about n iterators contained in the first cursor.

The cursor-information-recovery module 120 constructs and stores second cursor information by extracting n pieces of iterator information contained in the first cursor information for final-display recovery in response to the cursor-request message of the control module 160, and recovers the final display by mapping n pieces of iterator information of the stored second cursor information to third cursor information newly generated in response to the cursor-request message by referring to the query strings contained in the second cursor information.

To this end, the cursor-information-recovery module 120 includes an iterator-information-extraction module 130, a cursor-information-storage module 140, and an iterator-information-mapping module 150.

The iterator-information-extraction module 130 extracts iterator information from the first cursor information of the digital device having an embedded DBMS being in a normal operation in response to the cursor-request message.

The n pieces of iterator information are extracted from the first cursor information currently in use according to an iterator-information-extraction cycle of the control module 160.

The extraction of the n pieces of iterator information is performed by serializing the n pieces of iterator information by searching the query plan tree shown in FIG. 2.

The serializing of the iterator information is achieved by allocating numbers to the n pieces of iterator information existing at terminal nodes of the physical query plan tree for storing the position of the first cursor using the n pieces of iterator information contained in the physical query plan tree. The searching of the terminal nodes in the physical query plan tree is performed by at least one of depth first search and breadth first search, thereby serializing the n pieces of iterator information.

In the final-display-recovering apparatus according to an exemplary embodiment of the present invention, a search method corresponding to the search method used for iterator extraction is preferably used.

The cursor-information-storage module 140 constructs the second cursor based on the n pieces of iterator information extracted from the iterator-information-extraction module 130 and stores the same.

The second cursor information may be constructed by at least one of the iterator-information-extraction module 130 and the cursor-information-storage module 140. According to an exemplary embodiment of the present invention, the cursor-information-storage module 140 constructs the second cursor information based on the n pieces of iterator information of the first cursor, and stores the constructed second cursor information.

Since the second cursor information can be managed by the query-string-creating module 100, it is preferable that the second cursor information be constructed irrespective of the query-string-controlling module 110.

The iterator-information-mapping module 150 maps iterator information stored in the cursor-information-storage module 140 to newly created third cursor information by referring to the query strings contained in the second cursor information for the final-display recovery. The iterator-information-mapping module 150 performs mapping of the iterator information until the iterator information contained in the stored cursor information is completely recovered.

The control module 160 sets an iterator-information-extraction cycle to control the query-string-creating module 100 to create the query strings according to the set cycle and to return a cursor generated according to the query processing result corresponding to the created query strings to the query-string-creating module 100.

When the first cursor is returned to the query-string-creating module 100, the second cursor information is constructed and stored, the query strings contained in the previously stored second cursor information is loaded by the query-string-creating module 100 in a final-display recovery stage, so that the third cursor is created by the query-string-controlling module 110.

As described above, the control module 160 performs common control operations on the respective modules of the final-display-recovering apparatus according to an exemplary embodiment of the present invention.

In the final-display-recovering apparatus according to an exemplary embodiment of the present invention, the position of the first cursor is recovered such that the second cursor information is constructed by extracting the n pieces of iterator information determining the position of the first cursor in response to the cursor-request message from the control module 160 and the position of the first cursor is stored, and the iterator information contained in the second cursor information is mapped to new third cursor information.

Figure 3:
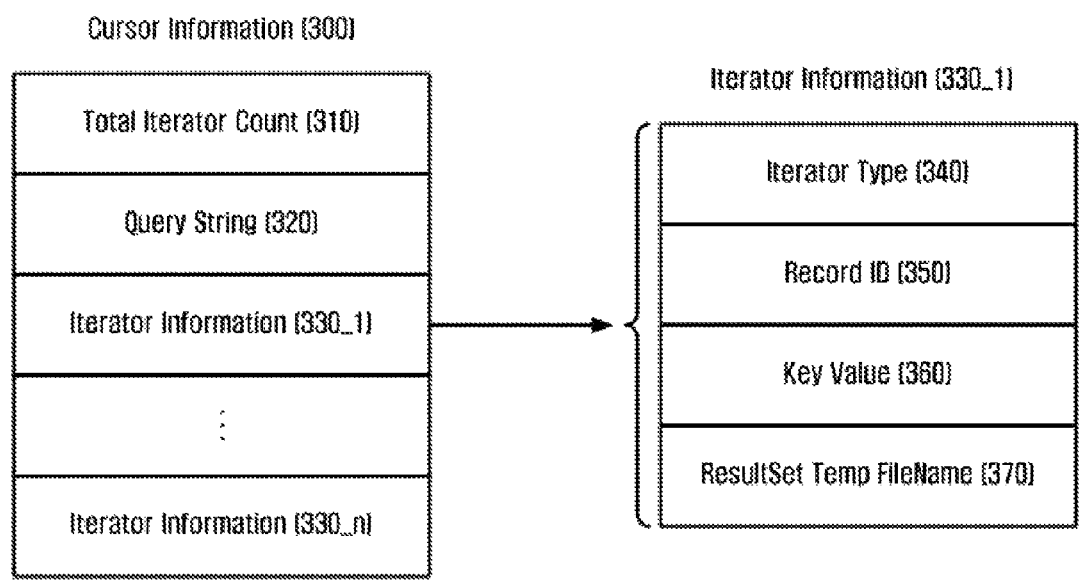
FIG. 3 illustrates cursor information according to an exemplary embodiment of the present invention.

FIG. 3 illustrates cursor information according to an exemplary embodiment of the present invention.

Cursor information and iterator information according to an exemplary embodiment of the present invention are query processing results of the query-string-controlling module 110 corresponding to predetermined query strings delivered from the query-string-creating module 100.

The illustrated cursor information is created in the query-string-controlling module 110 and returned to the query-string-creating module 100. The cursor information may be stored in the cursor-information-storage module 140 or used as recovery information in final-display recovery according to the cursor-request message.

The cursor information contains a Total Iterator Count 310, a Query String 320 for which the query-string-creating module 100 requests query processing, and one or more pieces of Iterator Information $330_{\_1}$-$330_{\_n}$.

Here, the Total Iterator Count 310 designates the number of n pieces of iterator information contained in the cursor information. The Query String 320 designates query string generated in response to cursor-request messages, e.g., "Select contents-id from Contents, Playlist, Fileposition where contents=playlist and fileposition, and 'disk1'" in the query plan tree shown in FIG. 2.

Meanwhile, at least one Iterator Information $330_{\_1}$ is extracted from the iterator-information-extraction module 130 in response to the cursor-request message, and may include an Iterator Type 340, a Record ID 350, a Key Value 360, and a ResultSet Temp FileName 370.

The iterator type 340 is classified into an index iterator and a table iterator on the basis of the physical query plan tree shown in FIG. 1.

The index iterator is an iterator for an indexed data structure, such as a tree or a hash, and the table iterator is an iterator for a record storage structure, such as a heap file.

The Key Value 360 and the Record ID 350 are index iterators. The Key Value 360 is used to identify a position of data in the indexed data structure. The Key Value 360 is stored in the iterator information and is used in searching for a position of data in performing query processing corresponding to predetermined query strings.

In a case where the Key Value 360 is stored in a duplicated manner in the indexed data structure, the Record ID 350 may be allocated to the Key Value 360 to search for a position of the Key Value 360.

The table iterator is an iterator used to directly search for data stored in the iterator information $330_{\_1}$, and the Record ID 350 may store a position of a particular record.

That is, when a portable digital device normally operates, the table iterator may include the Record ID 350 in which a record is stored for iterator position recovery, the Key Value 360 of a current cursor position, and the ResultSet Temp FileName 370 generated when the currently generated iterator is stored in a temporary file.

The iterator information includes n pieces of iterator information extracted from the first cursor information during normal operation of the portable digital device having an embedded DBMS, and the second cursor information is constructed based on the iterator information to then be stored in the cursor-information-storage module 140. The information stored in the cursor-information-storage module 140 is mapped to third cursor information newly created in final-display recovery in response to a cursor-request message, thereby recovering the first cursor information.

Figure 4:
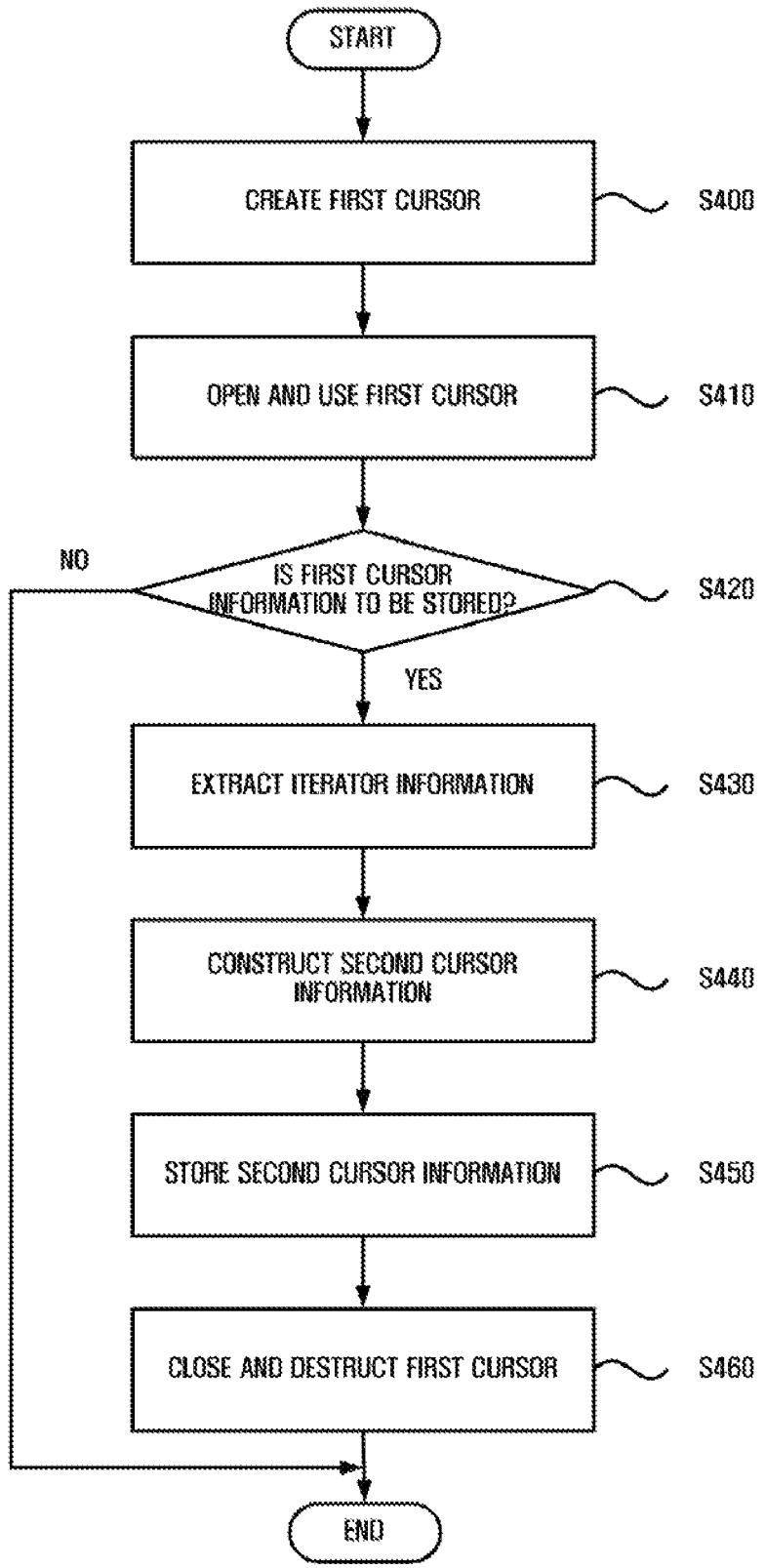
FIG. 4 is a flow diagram illustrating a method of storing cursor information according to an exemplary embodiment of the present invention.

FIG. 4 is a flow diagram illustrating a method of storing cursor information according to an exemplary embodiment of the present invention.

The storing of the cursor information according to an exemplary embodiment of the present invention comprises storing position information of the first cursor. In detail, n pieces of iterator information are extracted from the first cursor information to construct second cursor information and store the same.

As shown in FIG. 4, in a portable digital device having an embedded DBMS which operates normally, a first cursor is created as a result of general query processing in S400, and the created first cursor is opened and used in S410.

In S420, it is determined whether to store information about the first cursor in response to a cursor-request message delivered from the control module 160.

According to the result of determining whether to store the first cursor information in S420, the iterator-information-extraction module 130 extracts n pieces of iterator information from the first cursor information in S430. Here, the iterator information is extracted by serializing n iterators through number allocation, which is the same as described above with reference to FIG. 3, and a detailed explanation has been omitted.

Searching of the physical query plan tree may be performed by at least one of depth first search or breadth first search, according to the search mode set by the control module 160.

Once the iterator information is extracted from the first cursor information in S430, the cursor-information-storage module 140 constructs second cursor information based on n pieces of iterator information in S440.

The second cursor information is constructed based on the n pieces of iterator information extracted from the first cursor information, as described above with reference to FIG. 3, and a detailed explanation thereof has been omitted.

After the second cursor information is constructed in such manners as in S430 and S440, the second cursor information is stored in the cursor-information-storage module 140 according to the setting by the control module 160 in S450.

After the storing of the second cursor information is completed, the first cursor is closed and erased in S460.

According to an exemplary embodiment of the present invention, the cursor information can be stored in a predetermined storage cycle as set by the control module 160 during normal operation. Alternatively, the cursor information can also be stored for final-display recovery due to an interruption input such as abrupt power interruption (e.g., power interruption due to battery failure).

The second cursor information stored in the cursor-information-storage module 140 may be at least one piece of cursor information or a predetermined number of sets of cursor information according to the setting by the control module 160. In addition, the second cursor information may be optionally recovered by the cursor-information-recovery module 120.

Figure 5:
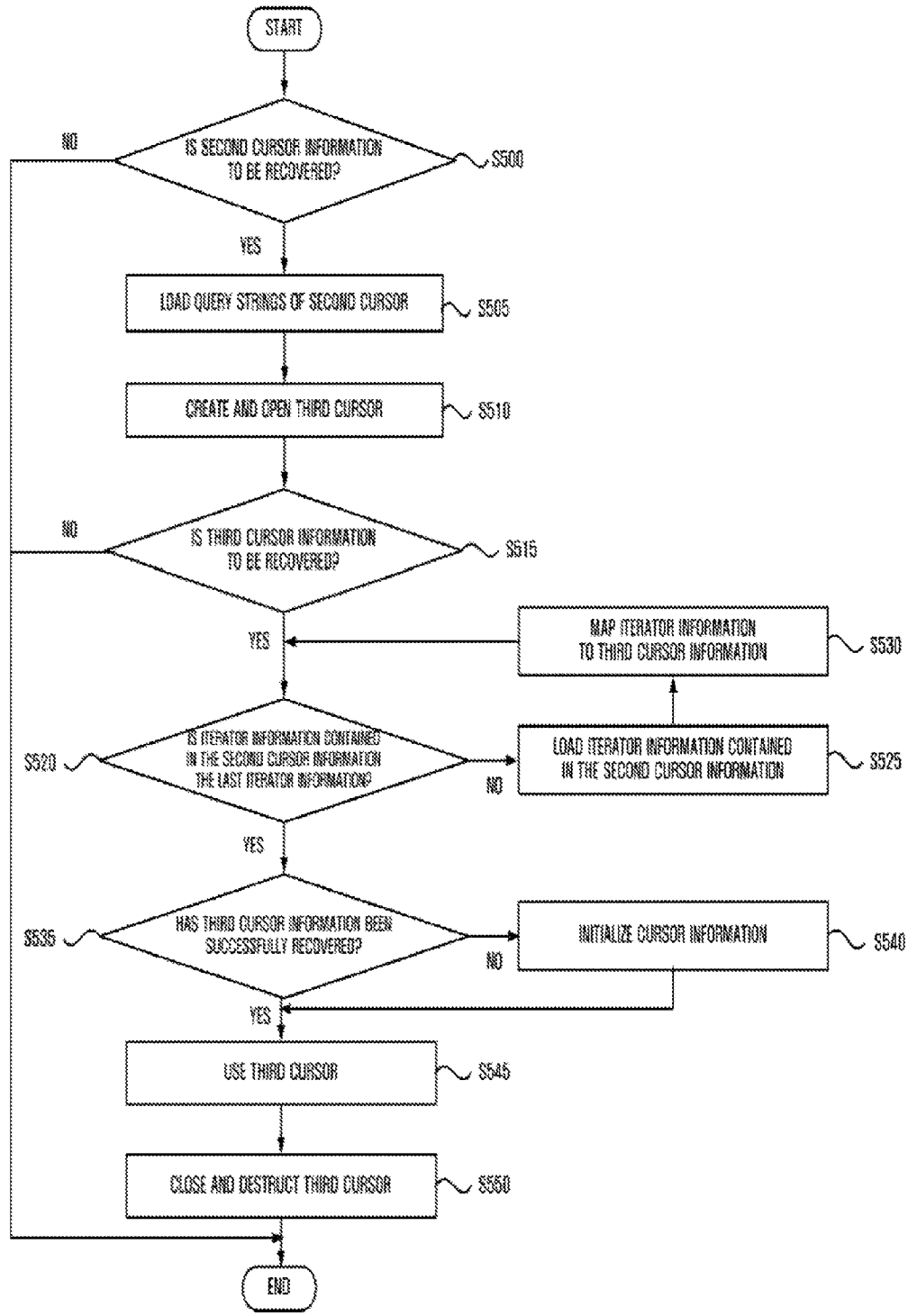
FIG. 5 is a flow diagram illustrating a method of recovering a final display according to an exemplary embodiment of the present invention.

FIG. 5 is a flow diagram illustrating a method of recovering a final display according to an exemplary embodiment of the present invention.

The final-display recovery according to the current exemplary embodiment of the present invention relates to recovery of a position state of first cursor information based on second cursor information stored in the cursor-information-storage module 140.

In a case where a digital device having an embedded DBMS in normal operation is booted, it is determined in a data acquisition operation whether to recover cursor information in S500.

According to the determination result, query strings contained in the second cursor information are loaded in S505. The loading of the query strings contained in the second cursor information is performed by the iterator-information-extraction module 130.

That is, the query-string-creating module 100 delivers the query strings contained in the second cursor information to the query-string-controlling module 110.

Once the query strings contained in the second cursor information are loaded in S505, a third cursor corresponding to the corresponding to the query strings is created and opened through an ordinary procedure in S510.

Once the creating and opening of the third cursor is completed in S510, it is determined whether to recover third cursor information in response to a cursor-request message sent from the control module 160 in S515.

Here, the determining whether to recover the third cursor information is made by searching for the second cursor information containing the same query strings as those of the cursor created by the cursor-request message.

That is, if the query strings of the newly created third cursor are identical with those of the second cursor query string, it is determined in S520 whether at least one of n pieces of iterator information contained in the second cursor information is the last iterator information. If the at least one among n pieces of iterator information contained in the second cursor information is not the last iterator information, the iterator information of the second cursor information is loaded in S525, and the iterator-information-mapping module 150 maps the loaded iterator information to the third cursor information in S530.

In detail, n iterators are loaded by a method corresponding to the search method of the iterator-extracting operation through serialization, and are then mapped to the third cursor information.

Once the mapping of the nth iterator information contained in the second cursor information is completed in S530, it is determined whether the third cursor information has been successfully recovered in S535.

If the third cursor information has been successfully recovered, the third cursor is used at the position of the first cursor in S545. In the course of using the third cursor containing position information of the first cursor, the third cursor currently in use is closed and erased in S550.

In contrast, if the third cursor information has not been successfully recovered, the cursor information is initialized in S540.

As described above, according to the apparatus and method of recovering the final display of an exemplary embodiment of the present invention, since only the cursor information containing n pieces of iterator information is stored in a portable digital device environment in which power is frequently turned on/off, a storage process for recovering the final display can be simplified. In addition, in recovering a final display based on pre-stored cursor information, data acquisition can be facilitated. Furthermore, since constructing cursor information and recovering the cursor information are not affected by the amount of content in a pertinent digital device, a query processing time for final-display recovery can be shortened.

It will be apparent to those skilled in the art that various modifications and changes may be made thereto without departing from the scope and spirit of the invention. Therefore, it should be understood that the above exemplary embodiments are not restrictive but illustrative in all aspects. The scope of the present invention is defined by the appended claims rather than the detailed description of the invention. All modifications and changes derived from the scope and spirit of the claims and equivalents thereof should be construed to be included in the scope of the present invention.

What is claimed is:

1. An apparatus for recovering a final display, comprising:
    a query string creating module which creates query strings in response to a cursor request message;
    a query string controlling module which creates a first cursor as a result of processing the query strings, and returns the created first cursor to the query string creating module; and
    a cursor recovery module which stores information about the first cursor, which comprises n pieces of iterator information, in response to a message which requests for storage of the first cursor information before the apparatus is turned off, and recovers information about a second cursor, which comprises the n pieces of iterator information extracted from the information about the first cursor, in response to a message which requests recovery of the second cursor information after the apparatus is restarted,
    wherein the cursor recovery module further comprises:
    an iterator information mapping module which maps the n pieces of iterator information to a third cursor information in response to the cursor request message to recover the final display when the apparatus is restarted, wherein the third cursor is created by referring to query strings contained in the second cursor.

2. A method of recovering a final display of a device, the method comprising:

creating query strings in response to a cursor request message;

creating a first cursor as a result of processing the query strings; and storing information about the first cursor, which comprises n pieces of iterator information, in response to a message which requests for storage of the first cursor information before the device is turned off, and recovering information about a second cursor, which comprises the n pieces of iterator information extracted from the information about the first cursor, in response to a message which requests recovery of the second cursor information after the device is restarted, wherein the recovering of the second cursor information comprises:

creating a third cursor by referring to query strings contained in the second cursor information to recover the final display when the apparatus is restarted; and mapping the n pieces of iterator information to the third cursor information.

3. A computer readable recording medium having embodied thereon a computer program for executing a method of recovering a final display of a device, the method comprising:

creating query strings in response to a cursor request message;

creating a first cursor as a result of processing the query strings; and storing information about the first cursor, which comprises n pieces of iterator information, in response to a message which requests for storage of the first cursor information before the device is turned off, and recovering information about a second cursor, which comprises the n pieces of iterator information extracted from the information about the first cursor, in response to a message which requests recovery of the second cursor information after the device is restarted, wherein the recovering of the second cursor information comprises:

creating a third cursor by referring to query strings contained in the second cursor information to recover the final display when the apparatus is restarted; and mapping the n pieces of iterator information to the third cursor information.

4. The apparatus of claim 1, wherein the cursor information recovery module further comprises:

an iterator information extraction module which serializes the n pieces of iterator information contained in the first cursor information and extracts the n pieces of iterator information contained in the first cursor information; and a cursor information storage module which constructs the second cursor based on the extracted n pieces of iterator information, and stores the constructed second cursor.

5. The method of claim 2, wherein the storing of the second cursor information further comprises:

serializing the n pieces of iterator information contained in the first cursor information and extracting the n pieces of iterator information contained in the first cursor information; and constructing the second cursor based on the extracted n pieces of iterator information, and storing the constructed second cursor.

6. The method of claim 2, wherein the extracting of the iterator information comprises extracting the n pieces of iterator information through a search to generate search results and the mapping of the iterator information comprises mapping the iterator information corresponding to the search results of the n pieces of iterator information.

7. The method of claim 3, wherein the storing of the second cursor information further comprises:

serializing the n pieces of iterator information contained in the first cursor information and extracting the n pieces of iterator information contained in the first cursor information; and constructing the second cursor based on the extracted n pieces of iterator information, and storing the constructed second cursor.

8. The apparatus of claim 4, wherein the iterator information extraction module extracts the iterator information through at least one of a depth first search and a breadth first search.

9. The apparatus of claim 4, wherein the iterator information extraction module extracts the iterator information in a search to generate search results and the iterator information mapping module maps the iterator information corresponding to the search results of the n pieces of iterator information.

10. The method of claim 5, wherein the extracting of the iterator information comprises extracting the n pieces of iterator information through at least one of a depth first search and a breadth first search.

* * * * *